ID     United States Patent [19]

Eichbaum et al.

[11] 4,260,589

[45] Apr. 7, 1981

[54] PRODUCTION OF ALUMINA FROM ALUMINUM NITRATE SOLUTIONS

[75] Inventors: Barlane R. Eichbaum, Reno; Judith A. Eisele, Verdi; Donald J. Bauer, Reno, all of Nev.

[73] Assignee: The United States of America as represented by the Secretary of the Interior, Washington, D.C.

[21] Appl. No.: 56,151

[22] Filed: Jul. 10, 1979

[51] Int. Cl.$^3$ .......................... C01F 7/24; C01F 7/30
[52] U.S. Cl. .................................. 423/123; 423/125; 423/132; 423/127; 423/631
[58] Field of Search ............ 423/123, 125, 631, 132, 423/390, 127

[56] References Cited

U.S. PATENT DOCUMENTS

| | | |
|---|---|---|
| 2,737,445 | 3/1956 | Nossen ................................. 423/390 |
| 3,366,446 | 1/1968 | Kelly et al. ......................... 423/631 |
| 3,864,462 | 2/1975 | Bruen et al. ........................ 423/631 |
| 3,925,538 | 12/1975 | Bruen et al. ........................ 423/631 |
| 4,044,115 | 8/1977 | Eisele et al. ........................ 423/631 |
| 4,094,955 | 6/1978 | Bayer et al. ......................... 423/631 |

*Primary Examiner*—Herbert T. Carter
*Attorney, Agent, or Firm*—William S. Brown; Donald A. Gardiner

[57] ABSTRACT

Aluminum nitrate solutions are subjected to hydrolysis at elevated temperature and pressure, with the pressure being kept relatively low by continual bleeding of reactant gases from the reaction vessel. The resultant product is a noncrystalline alumina that may be readily converted to crystalline alumina by roasting.

In addition, the discharged reactant gases are employed for leaching of clay to provide aluminum nitrate feed solution.

2 Claims, No Drawings

PRODUCTION OF ALUMINA FROM ALUMINUM NITRATE SOLUTIONS

Alumina is conventionally produced from clay by means of a process involving calcination of the clay, leaching of the calcined clay with nitric acid, removal of iron from the pregnant leach solution by solvent extraction, crystallization of $Al(NO_3)_3.9H_2O$ from the leach solution and calcining to convert the $Al(NO_3)_3.9H_2O$ to alumina. All of these steps are, however, energy intensive, and various modifications have been introduced in efforts to reduce energy requirements in production of alumina from clay. For example, U.S. Pat. No. 4,044,115 discloses a pressure hydrolysis procedure employing pressures above 500 psi and yielding a product of alumina monohydrate. U.S. Pat. No. 4,094,955 discloses a similar process in which the volatiles and heat resulting from the pressure hydrolysis are discharged into a chamber containing calcined clay and water, thereby utilizing these reaction products in production of additional aluminum nitrate from the calcined clay.

It has now been found, according to the process of the present invention, that a still more efficient production of alumina, particularly from clay, may be achieved by hydrolysis of an aluminum nitrate solution at a temperature of about 250° to 350° C., but at a substantially lower pressure, e.g., about 30 to 200 psi, preferably about 60 psi. It has been further found that this lower pressure is readily achieved by means of continuous bleeding of the vapors, consisting essentially of steam and oxides of nitrogen, from the reaction vessel in which the hydrolysis of the aluminum nitrate is carried out. Hydrolysis is generally complete in a period of about 0.5 to 3 hours.

The product resulting from hydrolysis of the aluminum nitrate at the lower pressure of the present invention is a noncrystalline alumina, rather than the alumina monohydrate of the above-mentioned prior art patents. This noncrystalline alumina can be water washed to remove impurities, such as sodium or calcium, and can be readily converted to crystalline alumina by roasting at a suitable temperature, i.e., about 750° to 1000° C.

Preferably, the vapors that are bled from the hydrolysis reaction vessel are discharged into a chamber containing clay and water in a manner similar to that disclosed in above-mentioned U.S. Pat. No. 4,094,955, thereby considerably increasing the efficiency of the overall process, i.e., recovery of alumina from clay. It has also been found, however, that the process of the invention is not limited to calcined clay as the raw material, but that the process is applicable to raw clay as well.

The hydrolysis of the aluminum nitrate solution may be carried out in any conventional vessel, such as an autoclave, capable of providing the required temperature and pressure, as well as means for bleeding off the vapors at a rate sufficient to maintain the required temperature and pressure in the hydrolysis reaction vessel. Suitable temperatures may be maintained in the reaction vessel by any conventional means such as a heating mantle.

Leaching of the clay to provide the aluminum nitrate solution may also be carried out in any conventional apparatus such as an autoclave, provided that it is adapted to receive the vapors that are bled from the hydrolysis reaction vessel. Temperatures and pressures employed in the leaching are somewhat higher than those conventionally employed for leaching of calcined clays, e.g., about 120° to 150° C. and about 50 to 100 psi, with about 20% to 50% of nitric acid. Although a portion of the acid, as well as heat, will be provided by the vapors bled from the hydrolysis reaction vessel, additional heat and acid will usually be required.

The process of the invention produces an alumina product directly from aluminum nitrate solution, thus obviating the step of crystallization of $Al(NO_3)_3.9H_2O$. In addition, as noted above, the noncrystalline alumina product is readily purified by washing, and the reduced pressure of hydrolysis permits use of less expensive reaction vessels.

The process of the invention will now be more specifically illustrated by the following example.

EXAMPLE

Two autoclaves (A-1 and A-2) were connected together by a line for the transfer of vapors from aluminum nitrate decomposition. One hundred and twenty-eight grams of $Al(NO_3)_3$ in 222 grams of water were placed in A-1 while 65 grams of raw clay and 100 grams of water were placed in A-2. The contents of A-1 were heated from room temperature to 300° C. over a 2-hour period during which time vapors were transferred from A-1 to A-2. The pressure in A-1 rose to ~60 psi. After the reaction in A-1 was complete, in a period of about 2 hours, a valve in the vapor transfer line was closed and A-1 opened and its contents removed. The material was water washed to remove impurities and the solid product (noncrystalline alumina) roasted to crystalline alumina. Product yield was 95 pct.

A-2 was mechanically stirred while the vapors were being transferred from A-1 to A-2. The clay slurry was heated to 120° C. (after valve closure) and maintained at that temperature for 3 hours, A-2 pressure rising to 90 psi. After cooling, the contents of A-2 were removed, filtered and washed. Aluminum recovery from the clay was approximately 90 pct.

We claim:

1. A process for production of alumina consisting essentially of treating an aqueous solution of aluminum nitrate in a reaction vessel at a temperature of about 250° to 350° C. and a pressure of about 30 to 200 psi for a time sufficient to substantially completely hydrolyze the aluminum nitrate and form a solid product consisting essentially of noncrystalline alumina, said pressure being maintained by continually bleeding vapors from the reaction vessel and discharging said vapors into a chamber containing clay and water, wherein the clay is leached to form additional aluminum nitrate solution.

2. The process of claim 1 in which the noncrystalline alumina product is water washed to remove impurities, and is then converted to crystalline alumina by roasting.

* * * * *